(No Model.)
D. A. RITCHIE.
SHEET METAL PIPE.
No. 338,877. Patented Mar. 30, 1886.
Fig: 1.
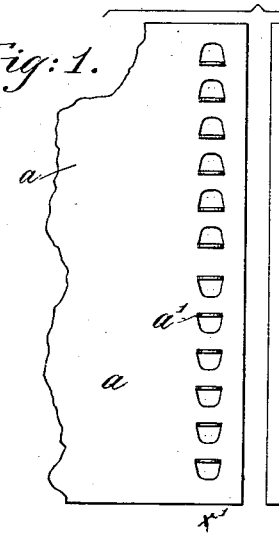
Fig: 2.
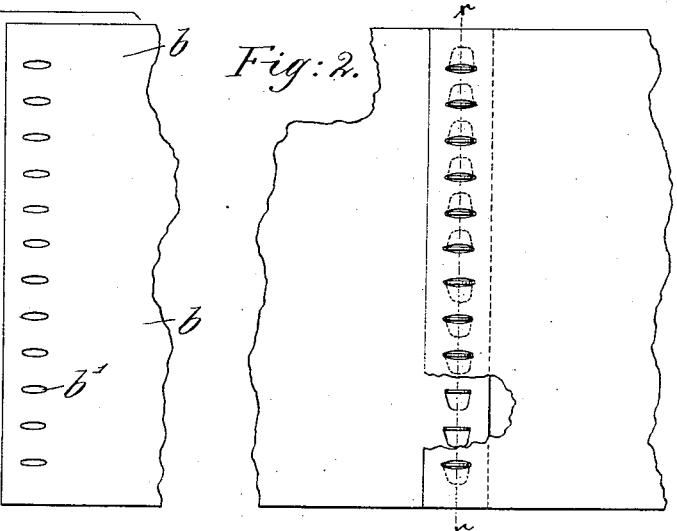
Fig: 3.
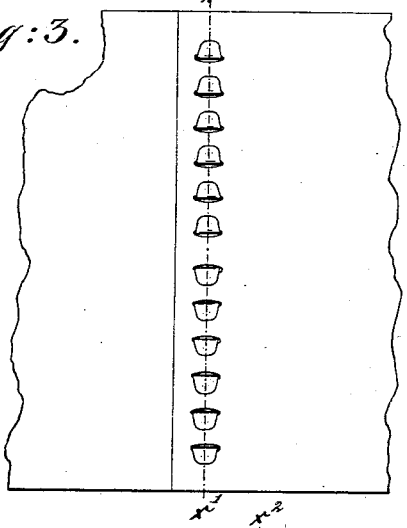
Fig: 4.
Fig: 5.
Fig: 6.
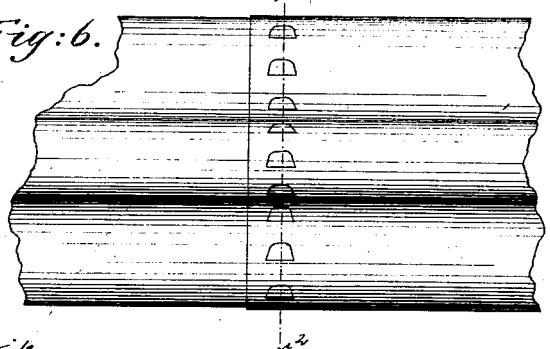
Fig: 7.
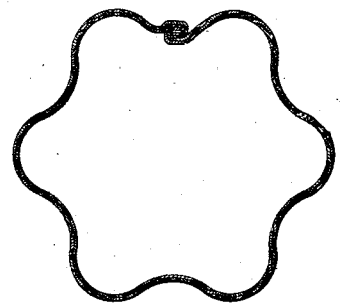
Witnesses.
Arthur Zipperlen
John F. G. Prindlerk
Inventor:
David A. Ritchie,
by Crosby Gregory attys

UNITED STATES PATENT OFFICE.

DAVID A. RITCHIE, OF CAMBRIDGEPORT, MASSACHUSETTS.

SHEET-METAL PIPE.

SPECIFICATION forming part of Letters Patent No. 338,877, dated March 30, 1886.

Application filed February 11, 1886. Serial No. 191,664. (No model.)

*To all whom it may concern:*

Be it known that I, DAVID A. RITCHIE, of Cambridgeport, county of Middlesex and State of Massachusetts, have invented an Improvement in Sheet-Metal Pipes, of which the following description, in connection with the accompanying drawings, is a specification, like letters on the drawings representing like parts.

This invention has for its object the production of a novel expansion-pipe, the same presenting in its construction a series of short lengths of pipe having locked longitudinal seams, the said short lengths of pipe being joined end to end by a series of projections of one entering a series of recesses of the other, after which the said projections are bent down, the joints so formed extending about the pipe annularly.

Prior to this invention it has been customary to solder together such short lengths of pipe, but such plan is open to the objection that the solder is liable to wear or break off, (particularly in case of expansion or contraction, for which this class of pipes is especially constructed,) and to the further objection that it is not practicable to galvanize or coat with molten metal pipes so soldered together, because the solder melts off in the heat of the bath.

Prior to this invention I have patented a plain round sheet-metal pipe, it being made from a long strip of material wound spirally into tube form, the edges of the spirally-twisted strip being united by prongs along one edge entering recesses along the other edge of the said strip.

In accordance with my invention, pieces of sheet metal having their ends cut to form projections and slots, are laid together end to end.
The projections are then rolled down to complete the junction of the ends of the said pieces and constitute the annular joints of the pipe. These strips of metal are then united to form a pipe by a longitudinal seam parallel to the center of the said pipe, and then the said pipe is given its desired shape in cross-section, the longitudinal seam being made preferably by a machine such as described in United States Patent No. 328,974, the corrugations in the pipe being preferably made by a machine substantially such as shown in application Serial No. 191,063, filed February 6, 1886, to which reference may be had.

Figure 1 shows the ends of two pieces of sheet metal prepared to be joined in accordance with my invention. Fig. 2 represents the two pieces shown in Fig. 1 as placed together. Fig. 3 represents the projections bent or rolled down. Fig. 4 is a section of Fig. 2 in the dotted line $x$. Fig. 5 is a section of Fig. 3 in the dotted line $x'$. Fig. 6 is a perspective view of a piece of pipe embodying my invention, and Fig. 7 is a section of Fig. 6 in the dotted line $x^2$.

In the manufacture of my improved pipe the pieces of metal $a$ $b$, which constitute each joint or pipe, are provided each at one end with a series of projections, $a'$, and at their other end with a series of recesses, $b'$. The projections referred to are formed by a punch which strikes and turns a portion of the metal out at right angles. The recesses $b'$ are formed by a punch which makes a slit of sufficient size to receive the projections $a'$, as represented in Fig. 4. The projections having been placed in the recesses, as represented in Figs. 2 and 4, are rolled or hammered down, as in Figs. 3 and 5, constituting a very strong water-tight joint. Referring to the drawings, it will be noticed that part of the projections $a'$ are turned in one and part in the opposite direction, which adds materially to the security of the joint. A number of pieces of metal having been jointed securely together, as stated, the said united pieces of metal are thereafter bent longitudinally to constitute a pipe. This longitudinal seam will be formed preferably in a machine substantially such as described in United States Patent granted to me, No. 328,794, dated April 3, 1885, and in the formation of the said pipe it will be corrugated or shaped to provide the pipes with expansion properties by a machine substantially such as described in application Serial No. 191,063, for United States Patent.

An expansion-pipe, such as herein described, and which may be made of any length, presents a longitudinal seam extending from end to end at one side of the pipe, the several sections or short lengths of the pipe having their joints where the end of one section fits into the end of the other section, united by means of prongs in recesses, thus forming a strong water-tight joint without the employment of solder, and providing means by which the sections are securely held together in the process of galvanizing.

I claim—

As an improved article of manufacture, a sheet-metal expanding-pipe having a longitudinal seam parallel with the center thereof, and composed of united sections having projections or recesses, the projections of one section entering recesses in the next section, thus forming annular joints, substantially as described.

In testimony whereof I have signed my name to this specification in the presence of two subscribing witnesses.

DAVID A. RITCHIE.

Witnesses:
G. W. GREGORY,
C. M. CONE.